JOHN VANSANT.
Improvement in Apparatus for Lighting Gas by Electrical Spark.
No. 127,000. Patented May 21, 1872.
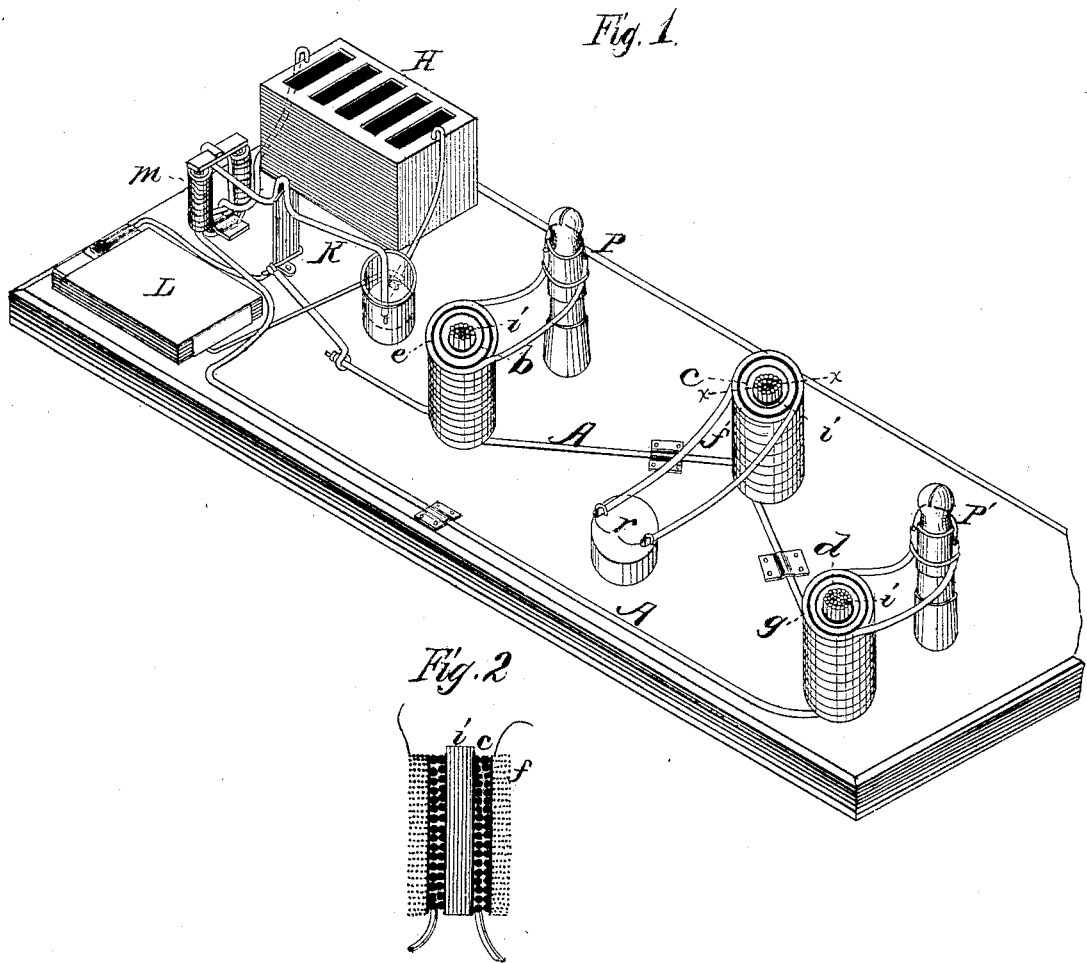
Witnesses.
C. E. Hudson
L. Nygatt
Inventor:
John Vansant

UNITED STATES PATENT OFFICE.

JOHN VANSANT, OF SAN FRANCISCO, CALIFORNIA.

IMPROVEMENT IN APPARATUS FOR LIGHTING GAS BY ELECTRICAL SPARKS.

Specification forming part of Letters Patent No. 127,000, dated May 21, 1872.

Specification describing certain Improvements in Apparatus for Producing Electric Sparks, invented by JOHN VANSANT, of San Francisco, in the county of Francisco, State of California.

This invention relates to an improved combination of apparatus to generate electric sparks simultaneously at two or more distant places by induction from one and the same current of low-tension electricity, avoiding thus the difficulties of conveying induced or static electricity between distant localities, where sparks may be required for igniting gas-jets, even when numerous and widely separated, as in street-lamps, and for exploding mines in military operations, blasting, and other purposes. My invention consists of the combination of a conducting-wire, coiled at several different parts of its length into primary inducing-helices containing cores of soft iron; a galvanic-battery or other source of dynamic electricity united in circuit with the coiled conducting-wire or series of connected primary helices; a series of separate, independent, secondary induction-helices, of fine insulated wire, for furnishing sparks; an automatic circuit-breaker for rapidly making and breaking the circuit of the coiled conducting-wire; and a condenser of metallic foil, attached on both sides of the rupture-point in the conducting-wire, for heightening the effects of the induced current.

Figure 1 is a view, in perspective, of an apparatus embodying my invention. Fig. 2 is a vertical central section of a combined secondary and primary helix and core, the line $x\,x$, Fig. 1, indicating the plane of section.

H in the drawing is a galvanic battery, which may be preferably constructed of pairs of carbon and zinc plates, arranged to be easily immersed in or withdrawn from a solution of bichromate of potash in dilute sulphuric acid. K is an automatic circuit-breaker, composed of an electro-magnet, $m$, which, when excited, attracts an armature on one end of a vibrating lever, lifting thereby the opposite bent end from contact with mercury contained in a glass cup and covered by alcohol. This action breaks the circuit composed of the battery H, the circuit-breaker K, the coil of the electro-magnet $m$, and the connected series of electro-magnetic helices $b\,c\,d$, to be described below. The current being interrupted, the attraction of the electro-magnet $m$ ceases, and the lever is thrown, by the elasticity of a spring, to which it is attached as a fulcrum, so that its bent end is again in the mercury, completing its circuit. This vibration of the lever, rapidly making and breaking the circuit, continues so long as the electricity passes. A denotes a continuous electric-circuit wire, which may be of greater or less length, and which is coiled, at any required intervals, into helices $b\,c\,d$ having their spirals properly insulated. A core of soft iron, $i$, preferably of iron wires, is placed within each of these helices in order to increase, by its electro-magnetic induction, the force of the current in the secondary coils. One end of the wire A is attached to the spring of the break K and the other end to the wire around the electro-magnet $m$; or this last end may be buried and the ground used as a part of the circuit. $e\,f\,g$ are secondary coils, each formed of a long, fine, insulated wire. They surround the helices $b\,c\,d$, but have no metallic connection with them, or with one another. They are separate independent coils, each having its own distinct current; but all the currents generated by induction are generated at the same time from the single current traversing the circuit-wire A and the helices $b\,c\,d$. These induced currents produce sparks at the two ends of the wire forming each of the coils $e\,f\,g$, and these ends can be placed so as to use the sparks for lighting gas-jets, as shown at P P', or for exploding a proper cartridge in a mine, or in blasting, as represented at $r$. L is a condenser composed of alternate sheets of tin-foil and waxed paper, or its equivalent, piled together, and so arranged that the end of every other sheet of tin-foil projects beyond the paper. These projecting portions are all brought together at each end of the pile of sheets, and connected, one series with the wire from the battery to the mercury-cup, the other series to the spring of the break K, the point of rupture of the curcuit being between.

In operating the apparatus the course of the electricity will be from the positive pole of the battery to the mercury in the glass cup; thence along the bent lever to the spring of the break; thence through the continuous circuit-wire and helices $b\,c\,d$ to the wire of the electro-magnet $m$, (or to the earth, the wire of the electro-magnet $m$ being also buried;) and thence to the negative pole of the battery. At the moment of rupture of the circuit a portion of the extra current is used to charge the condenser, thus lessening the extra spark at the surface of the mercury, breaking the current more suddenly, and increasing the length of the induction-sparks at the terminals of the secondary coils.

Having thus described my invention, I will state that I make no claim to the combination of a galvanic-battery, a circuit-breaker, a condenser, and a single helix of coarse wire inclosing an iron core, with a single coil of fine wire, since I am aware that such a combination is not new; but

I claim as my invention and desire to secure by Letters Patent—

The combination of a source of dynamic electricity, H, an automatic circuit-breaker, K, a condenser, L, and a series of connected electro-magnetic primary coils, $b\ c\ d$, with a series of disconnected secondary induction-coils, $e\ f\ g$, substantially in the manner and for the purposes set forth.

JOHN VANSANT.

Witnesses:
C. E. HUDSON,
L. MYGATT.